United States Patent [19]
Mueller et al.

[11] Patent Number: 5,443,733
[45] Date of Patent: Aug. 22, 1995

[54] METHOD AND APPARATUS FOR TREATING WASTE WATER

[75] Inventors: Mario Mueller, Reinbek; Ivan Sekonlow, Hamburg, all of Germany

[73] Assignee: Daimler-Benz Aerospace Airbus GmbH, Hamburg, Germany

[21] Appl. No.: 65,607

[22] Filed: May 21, 1993

[30] Foreign Application Priority Data

May 21, 1992 [DE] Germany .......... 42 16 742.6
Jan. 28, 1993 [DE] Germany .......... 43 02 319.3

[51] Int. Cl.$^6$ .............................. B01D 61/04
[52] U.S. Cl. .................. 210/651; 210/652; 210/259
[58] Field of Search ......... 62/532, 533, 534, 535, 62/537, 540, 541, 542; 4/317; 210/259, 181, 186, 184, 185, 651, 652

[56] References Cited

U.S. PATENT DOCUMENTS

| | | | |
|---|---|---|---|
| 4,116,652 | 9/1978 | Zondek | 62/534 |
| 4,202,061 | 5/1980 | Waters | 4/317 |
| 4,572,785 | 2/1986 | Braaten | 210/181 |
| 4,770,770 | 9/1988 | Regunathan et al. | 210/181 X |

FOREIGN PATENT DOCUMENTS

3715759 12/1989 Germany .

OTHER PUBLICATIONS

"Transactions of ASME", Journal of Engineering for Industry, vol. 97, No. 1 Feb. 1975, pp. 224–227 by A. L. Ingelfinger et al.; entitled Integrated water and waste management system for future spacecraft.

*Primary Examiner*—Frank Spear
*Attorney, Agent, or Firm*—W. G. Fasse; W. F. Fasse

[57] ABSTRACT

In air- and spacecraft and where drinking water supplies are scarce it is necessary to reuse the available water due to the limited tank volume available for the water supply. Such reuse calls for a water treatment. For this purpose a freeze concentration stage or preferably two such stages are integrated into a sequential waste water treatment system, including mechanical filters followed by the freeze concentration stage, which in turn is followed by micro- and ultrafiltration, reverse osmosis, and charcoal filter stages. A final stage includes a disinfection by ultraviolet radiation. The operation of the system is monitored by measuring the electrical conductivity of the water being treated. The use of one or two freeze concentration stages provides a universal cleaning capable of handling waste water of any composition. The selection of stages downstream of the freeze concentration stages is variable, depending on the degree of purification required.

13 Claims, 4 Drawing Sheets

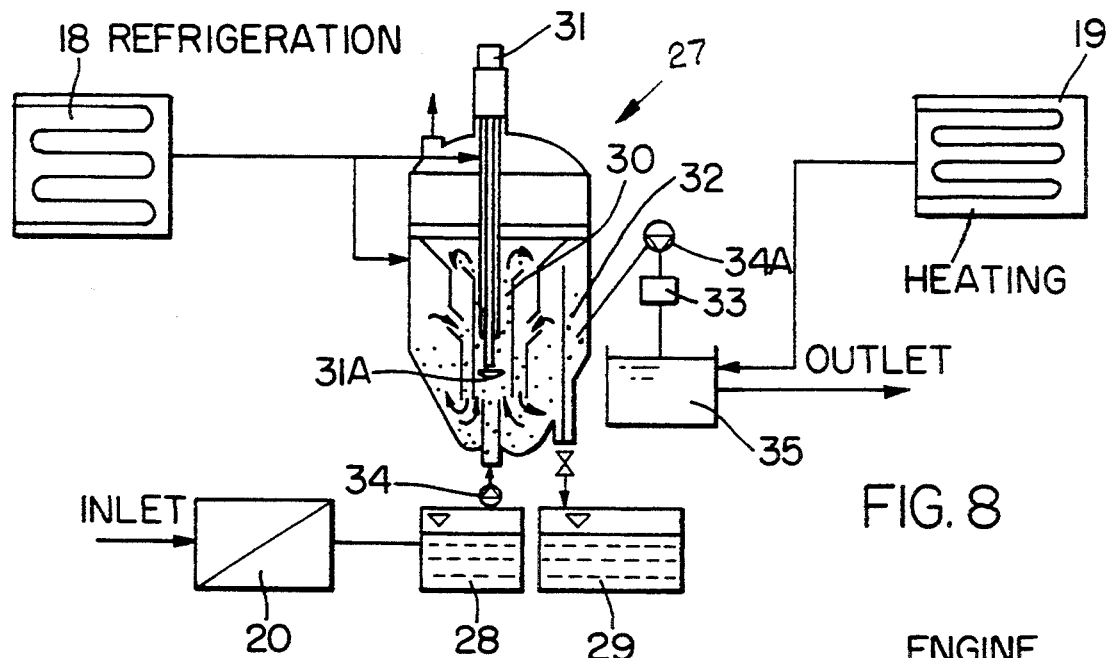
FIG. 8
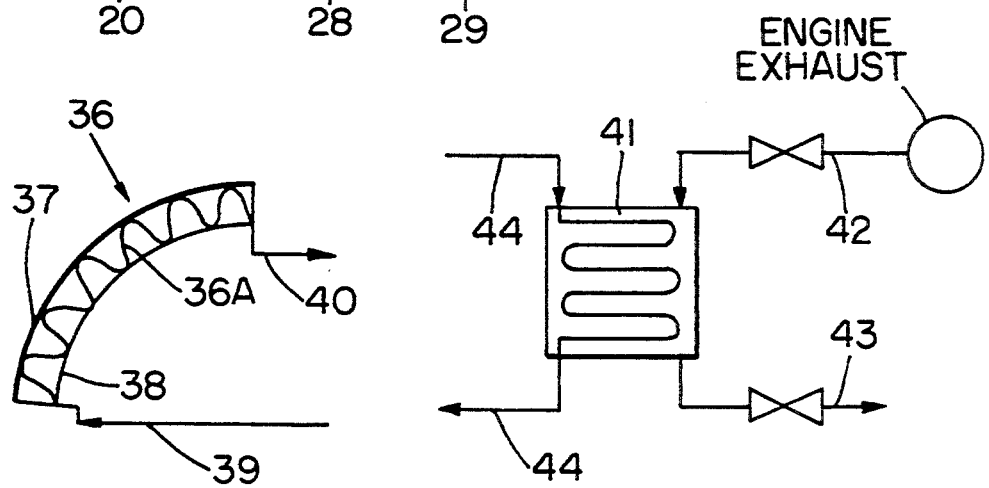
FIG. 9
FIG. 10
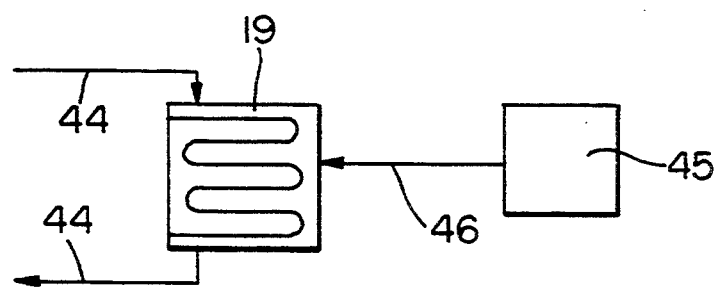
FIG. 11

METHOD AND APPARATUS FOR TREATING WASTE WATER

FIELD OF THE INVENTION

The invention relates to a method for treating waste water so that the resulting treated water can be reused, especially in an aircraft or in a spacecraft. The invention also relates to an apparatus for performing the method.

BACKGROUND INFORMATION

Systems for recovering waste water for repeated use conventionally include the following stages through which the water being treated passes at least once. A tank for holding the waste water is connected through a pump to mechanical filters which in turn communicate with a reverse osmosis stage. The output of the reverse osmosis stage leads to an active charcoal treatment stage. The output of the charcoal stage is connected to a disinfection stage.

In connection with passenger aircraft and to some extent also in connection with cargo aircraft, there exists the continuous need for improving the comfort of the passengers and/or crew. This need conflicts with the limited loading capacity of an aircraft, because, on the one hand, as much water as possible should be taken along for drinking and other purposes, while on the other hand, the water volume to be carried along should be minimized to increase the payload. As a result, it is necessary to optimally utilize the water quantity that can be taken along under economically feasible conditions, for example, for satisfying ever increasing comfort requirements such as the provision of washing and even showering facilities on long distance flights. On short distance flights the need for reducing the water quantity to an absolute minimum is even larger. Thus, there is room for improvement in the just outlined area as well as other areas where large quantities of drinking quality water are not readily available.

An article entitled "Integrated Water and Waste Management System for Future Spacecraft" by A. L. Ingelfinger et al., was published in "Transactions of the ASME", Journal of Engineering for Industry, Vol. 97, No. 1, February 1975, pages 224 to 227, in which a solution of the above outlined problem is suggested for spacecraft. More specifically, waste water treatment is accomplished by a method in which substantially evaporation is employed in combination with a catalytic oxidation of components suspended in the water. This approach requires substantial heat that is produced by using radioactive isotopes. Thus, the known method has the disadvantage that the radiation required for the waste water treatment is not suitable for passenger aircraft due to safety and health reasons. Furthermore, the required high energy consumption of the known apparatus for the waste water treatment is available only by using atomic energy, but becomes unfeasible if other sources of energy must be used for the above evaporation and catalytic oxidation.

Another solution to the above outlined problems is disclosed in German Patent Publication (DE-PS) 3,715,759, published on Dec. 21, 1989, relating to a water supply system, especially for use on board of an aircraft. The known system passes the waste water through a plurality of stages until drinking water quality is achieved. The known system includes a mechanical filter, a pump, a charcoal filter including activated charcoal, an ozone stage, and a reverse osmosis stage followed by a disinfecting stage. The just mentioned known system has the disadvantage that for a sufficiently high cleaning effect in the ozone stage, substantial contact times are required for treating the waste water with ozone. Another disadvantage is seen in that the substantial space is required if the known system is of a size that assures a commercially feasible throughput volume through the known system.

So-called freeze concentration reactors are known for use in chemical and food processing. However, heretofore such reactors have not been used for waste water treatment in aircraft nor in spacecraft.

OBJECTS OF THE INVENTION

In view of the foregoing it is the aim of the invention to achieve the following objects singly or in combination:

to perform a waste water treatment, especially in an aircraft or in a spacecraft, in such a manner that all safety requirements are met, that the needed equipment has an optimally small weight and requires little space while efficiently making use of lost cost energy sources readily available for this purpose in an aircraft or spacecraft;

to construct a system for the treatment of waste water in an air- or spacecraft or where low cost energy is readily available for providing fresh water of drinking water quality, and/or use water, for example, for flushing toilets;

to make sure that cleaning stages using membranes do not receive partially treated water that will adversely affect the ability of the membranes to perform their functions, for assuring a substantially continuous operation at least during flight;

to employ a controlled freeze concentration so that by controlling the velocity of crystallization, it is possible to control the degree of purification; and to include a freeze concentration stage in the apparatus for performing the method of the invention.

SUMMARY OF THE INVENTION

According to the invention, at least one freeze concentration step or stage is incorporated into the purification of waste water, especially in an aircraft or spacecraft employing mechanical filtering, at least one membrane stage, a charcoal filter stage, and a disinfection stage.

A main advantage of the invention is seen in that the waste water may have substantially any composition since the freeze concentration stage functions as a universal cleaning stage in combination with further cleaning stages mentioned above. According to the invention it is possible to provide a purification degree required for drinking water because impurities in solution and solid impurity particles are efficiently removed in such a system. Additionally, the use of a freeze concentration stage does not at all impair the safety of the craft and uses available energy efficiently.

In a preferred embodiment of the present system the freeze concentration stage is arranged upstream, preferably directly upstream, of a membrane separation stage, whereby a rapid decline of the cleaning capacity or efficiency of the membrane is avoided because substances that otherwise would adversely affect the performance of the membrane, such as acids, free chlorine, or oxygen are prevented from reaching the membrane stage. As a result, the operational life of the membranes and their cleaning efficiency is substantially longer than was possible heretofore.

In a further preferred embodiment the freeze concentration stage substantially comprises a crystal layer reactor, for example, of the trickle film type which receives the waste water from a tank through a pump and through a mechanical filter. The crystal layer reactor is connected to refrigerating and heating devices, whereby the melted down ice, or rather the resulting water, is collected either in the same container for recirculating or in a collecting container for repeated use. This embodiment has the advantage that the crystal layer reactor, such as a trickling film reactor, requires a relatively small technical effort and expense due to its simplicity. Additionally, such a reactor requires a relatively small space, has a good cleaning efficiency and satisfactory throughputs.

Another preferred embodiment uses a crystallization roller in the freeze concentration stage. The roller is cooled by a refrigeration unit and is rotatably mounted in a water container receiving the waste water so that the roller merges at least partially into the waste water. Ice crystal layers continuously forming on the roller are shaved off by a scraper. The scraped off ice is melted with the aid of a heating unit which, for example, in an aircraft may receive tapped-off air from the aircraft engines. The melted water is collected in a further container. Such a freeze roller has the advantage of a good cleaning efficiency which is sustained in a continuous operation.

In another preferred embodiment the freeze concentration stage is equipped with a crystal suspension reactor wherein one or more external separation columns are provided for recovering the cleaned water which is collected in a respective container. The crystal suspension reactor receives the waste water with the help of a pump from a waste water container and the reactor is cooled by a refrigeration unit or units that are in heat exchange contact with the environment of the air- or spacecraft. Such an embodiment has the advantage that due to relatively small crystal growth velocities, the degree of purification is quite high, whereby high purification efficiencies are achieved.

By utilizing the cold temperatures outside an aircraft at high altitudes, a very efficient operation is achieved, since very little other energy is needed.

By constructing the freeze concentration reactor in another preferred embodiment of the invention as a double-walled container divided into several chambers it is possible to utilize the crystallization heat occurring on a cooled wall surface for the melting of an ice layer on another wall surface in the same container. However, electrical energy may also be used for the melting. In both instances, heat available anyway in the aircraft or other craft is used for the melting of the ice layer, whereby again the total required energy is substantially reduced.

BRIEF DESCRIPTION OF THE DRAWINGS

In order that the invention may be clearly understood, it will now be described, by way of example, with reference to the accompanying drawings, wherein:

FIG. 8 illustrates schematically a freeze concentration device in the form of a crystal suspension reactor;

FIG. 9 shows schematically a heat exchanger cooperating with an outer skin portion of an aircraft for a heat exchange;

FIG. 10 illustrates a heat exchanger for using hot exhaust gases from an aircraft engine for a heat exchange; and FIG. 11 shows a heat exchanger cooperating with an electrical power generator.

Figure 1:
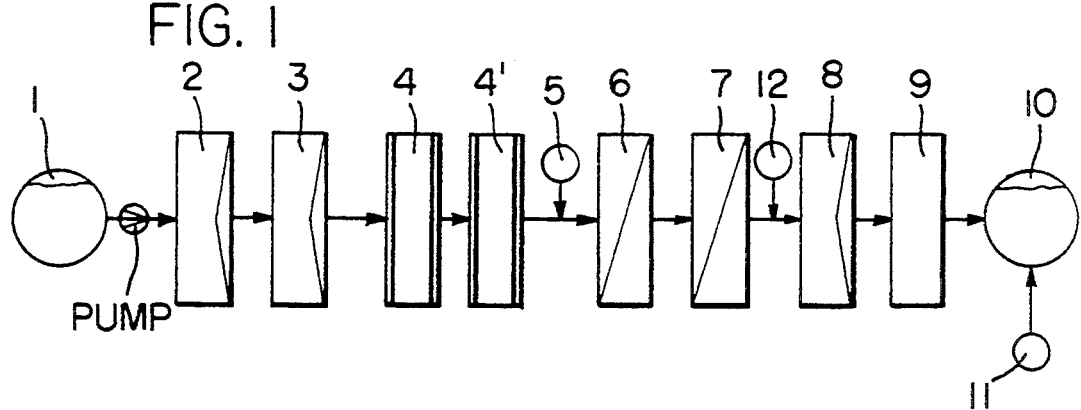
FIG. 1 shows in block form a first embodiment of a waste water treatment system according to the invention, including a reverse osmosis stage.

DETAILED DESCRIPTION OF PREFERRED EXAMPLE EMBODIMENTS AND OF THE BEST MODE OF THE INVENTION

FIGS. 1 to 4 will first be generally described. Further, the Tables 1, 2, 3, and 4 shown below correlate to FIGS. 1, 2, 3, and 4 in the same order. Each Table illustrates the parameters relevant to the corresponding figure. The last row in each Table indicates the reference numbers of the several stages in the corresponding figure. In each of FIGS. 1 to 4, the use of at least one freeze concentration stage is important according to the invention.

It has been found that the use of a freeze concentration stage according to the invention makes it possible to recover waste water substantially independently of the initial composition of the waste water, whereby, depending on the use of further stages as disclosed herein, the quality of the recovered water may reach drinking quality after solid and solution components have been removed.

According to the invention, one of the stages, namely the freeze concentration stage, employs a thermal separation method based on a phase transformation from the liquid phase to the solid phase in the form of ice which is then melted again. By cooling the waste water, also referred to as "solution" herein, the solution is brought into a super-saturated state, whereby the phase transformation takes place resulting in the formation of ice crystals. Depending on the velocity of crystallization, the ice crystals can be substantially completely free of contaminations, because molecules representing such contaminations are relatively large, and because these molecules have a configuration which is not suitable for the formation of mixed crystals in the ice crystals. As a result, the freeze concentration practically removes all components be they in solution or in the form of solid particles, from the water without regard to any preference of specific components. However, at very low concentrations it is possible that so-called point defects may occur in the crystal lattice. Such defects may, for example, include ammonia $NH_3$ or ammonium fluoride $NH_4F$, or hydrogen fluoride HF.

The column headings in the Tables 1, 2, 3, and 4 are self-explanatory. Similarly, the headings for each row are self-explanatory. Each row shows the removal of the particular contamination as the waste water passes sequentially through the series connected stages and eventually becomes clean use water or even drinking water. The volume and weight indications in each Table relate to the particular stage, not to the water.

The function of the individual stages will now be described generally for all figures. The mechanical filter stage 2 separates solid material particles out of the solution. Screen filters may be used for separating larger particles and gap filters 3 may be used for separating particles having particle sizes in the range of 15 to 20 μm. The inlet of the first mechanical screen filter 2 is connected through a pump to the waste water tank 1. According to the invention one or two freeze concentration stages 4, 4' are arranged in series downstream of the gap filter 3. These stages 4, 4' remove particles, as well as materials in solution from the water being treated. The cleaning efficiency depends substantially on the crystal growth rate. FIGS. 5, 6, 7, and 8 illustrate different embodiments of freeze concentration stages.

A pH value control device 5 is arranged downstream of the freeze concentration stage or stages for bringing the pH value into the neutral range of about 7. Pure water has a pH value of 7.

The next following stage 6 is a micro and/or ultra filtration stage for removing germs and materials in solution. The separation limit of a microfiltration stage is somewhat lower than that of an ultrafiltration stage. It is important to arrange the stage 6 upstream of the reverse osmosis stages 7, 7' to make sure that any particulated material is kept away from the reverse osmosis stage or stages 7, 7' and from the active charcoal filter stages 8.

The reverse osmosis stages 7, 7' use membrane separation techniques which provide very clean water. The water being treated or the solution is brought into contact with semipermeable membranes through which the water is passed under a pressure larger than the osmotic pressure. The membranes are nonpermeable for bacteria and different organic materials, whereby a high degree of purification is achieved. However, the degree of purification depends much on the concentration of contaminants and on the solvent in the water being treated. High concentration of contaminants mean a high osmotic pressure and hence there is the danger of a concentration polarization just upstream of the membrane. Further, it is necessary that the membrane or membranes are exposed to small concentrations of materials that adversely affect the operation of the membrane. Such materials are, for example, acids, free chlorine, oxygen, and organic solvents as well as bacteria and generally sediments. These materials may contact the membranes only in very small concentrations. This requirement is satisfied by the stages upstream of the reverse osmosis stage 7 or stages 7'. Thus, it is necessary for these upstream stages to have an adequate retention capacity for the materials that would otherwise adversely affect the operation of the osmosis membranes.

The active charcoal stage 8 makes sure that organic materials in solution are adsorbed by the charcoal. The invention assures that the effluents from the stages upstream of the charcoal stage 8 contain only small or preferably optimally small quantities of contaminants. As a result, the charcoal stage 8 achieves a high degree of purification according to the invention.

The disinfection stage 9 irradiates the clean water with ultraviolet radiation to achieve a hygienically satisfactory quality of the recovered water. Most microorganisms are killed by relatively short duration contact times with ultraviolet light. All embodiments of the invention preferably comprise a technically simply constructed active charcoal filter stage 8 and an ultraviolet radiation stage 9 for hygienic safety reasons.

An electrical conductivity measuring device 12 is provided between the reverse osmosis stage 7 and the charcoal filtering stage 8. As the tables show, the cleaner the water becomes, the lower is the electrical conductivity in micro-Siemens/cm.

As mentioned, FIG. 1 illustrates an embodiment with two sequentially arranged freeze concentration stages 4 and 4'. Otherwise, FIG. 1 includes the above described stages. The output of the last disinfecting stage 9 is collected in a tank 10. The content of tank 10 is mineralized from a source 11, because the water coming out of the last stage 9 is free of minerals. The addition of minerals will follow regulation requirements for drinking water to be used on aircraft or spacecraft.

In addition to the pump shown, further pumps may be provided between neighboring stages. The sensor 12 for the conductivity of the water being treated also provides an indication for the proper operation of the system. An unusually high conductivity of the water downstream of the reverse osmosis stage 7, indicates that the stages upstream of the sensor 12 do not work properly. Hence, the conductivity sensor 12 is used as a process monitor.

Table 1 illustrates the parameters for the operation of the recovery system shown in FIG. 1. The system of FIG. 1 provides recovered water of drinking water quality due to the combination of two freeze concentration stages 4, 4' with at least one reverse osmosis stage 7, with the charcoal filtering, and with the ultraviolet irradiation.

Figure 2:
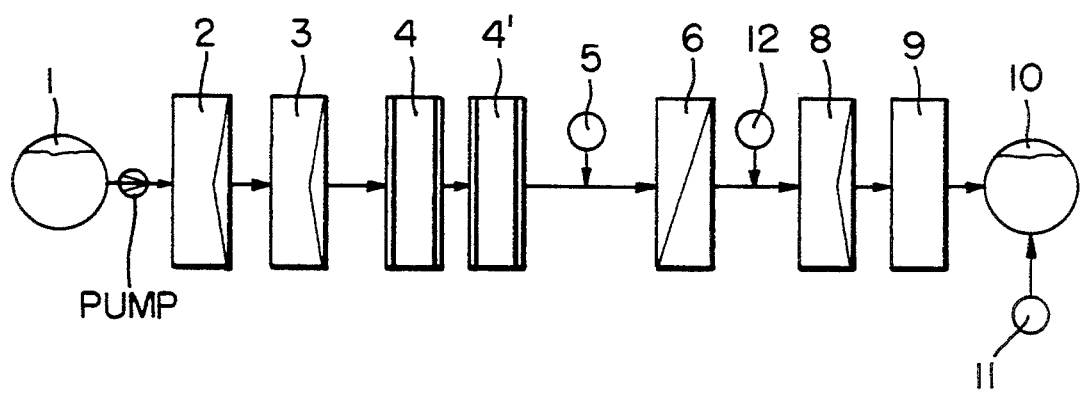
FIG. 2 is a view similar to that of FIG. 1, but showing another embodiment without a reverse osmosis stage.

The system of FIG. 2 omits the reverse osmosis stage altogether. As a result, Table 2 shows that the conductivity is substantially higher, 36 micro-Siemens/cm compared to 6 micro-Siemens/cm in Table 1. Nevertheless, the output of stage 9 achieves almost drinking water quality. Thus, the system of FIG. 2 can be used to provide recovered use water for washing and similar purposes.

Figure 3:
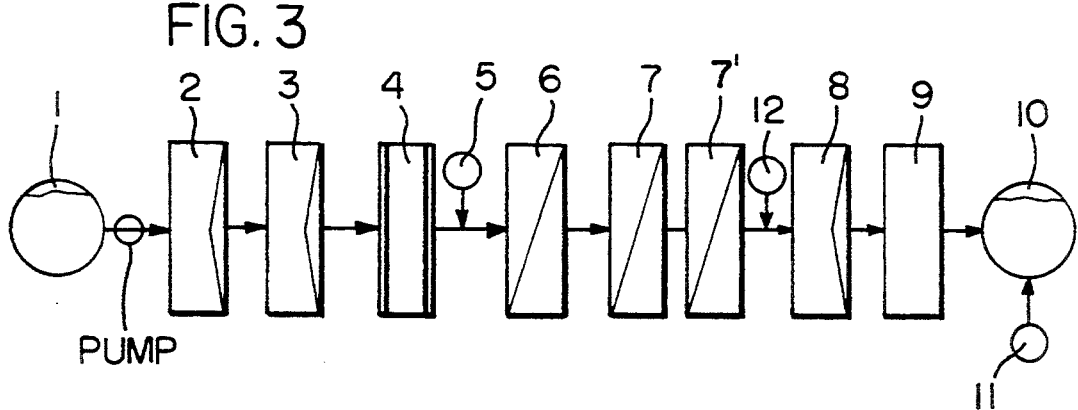
FIG. 3 is a view similar to that of FIG. 1, but showing an embodiment in which instead of two freeze concentration stages only one such stage is used and wherein two reverse osmosis stages are employed.

FIG. 3 illustrates a system in which only one freeze concentration stage 4 is used, followed by a micro- and ultrafiltration stage 6, which in turn is followed by two reverse osmosis stages 7 and 7'. Table 3 shows that use water is obtained of a substantially good quality that reaches almost drinking water quality. Such water is preferably used for rinsing and washing purposes. Comparing the weight and volume requirements shown in Tables 1 and 3 it is noted that the system of FIG. 3 is lighter and requires less space.

Figure 4:
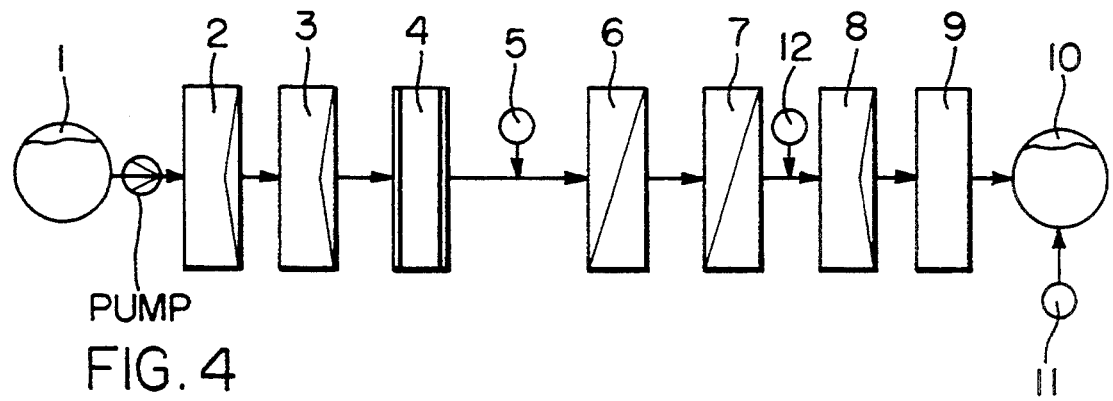
FIG. 4 is an embodiment similar to that of FIG. 1, but using only one freeze concentration stage instead of two.

FIG. 4 illustrates a system similar to FIG. 3 in that only one freeze concentration stage 4 is used. Downstream of the freeze concentration stage 4 the system of FIG. 4 corresponds to that of FIG. 1. Thus, the single freeze concentration stage is followed by a single reverse osmosis stage. Referring to Table 4 it is noted that use water of good quality is obtained which is, for example, suitable for toilet flushing and the like. Mineralization may be omitted if it is clear that the water will be used exclusively for toilet flushing.

Figure 5:
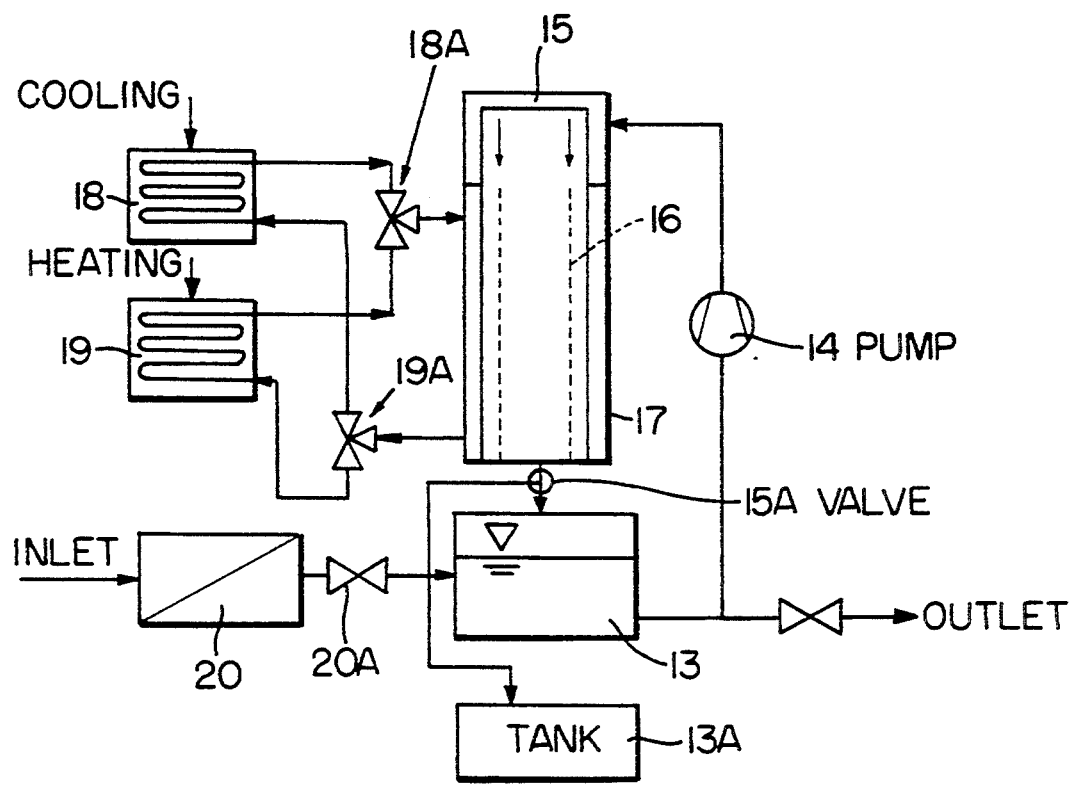
FIG. 5 illustrates a schematic block diagram of a freeze concentration stage comprising a trickle film reactor with a double-walled container.

FIG. 5 illustrates one embodiment of a freeze concentration stage that may be used according to the invention. The stage is constructed as a trickle film reactor in which a crystal layer 16 is formed on the inner surface of a double-walled cylindrical tank 15. Waste water comes through the inlet into a filter 20 which supplies the filtered output through a valve into a container 13. The filter 20 may comprise a screen filter 2 and a gap filter 3. The output of the container 13 is connected through a pump 14 to the upper end of the vertically oriented tank 15. The double wall 17 of the tank 15 is connected to a coolant circulating circuit including a cooling heat exchanger 18. As a result, the crystal layer 16 is formed on the inner surface 17 of the tank 15. Preferably, the heat exchanger 18 takes advantage of the low temperatures prevailing in the environment of an aircraft at high altitude. Such a heat exchanger will be described below with reference to FIG. 9. When a sufficient ice crystal layer 16 has been formed, the valves 18A, 19A are switched over to start a heating cycle with the aid of a heat exchanger 19 to melt the ice crystal layer 16. The heat for the heat exchanger 19 may be provided as shown in FIG. 10 utilizing hot gases from an engine, e.g. an aircraft engine exhaust as shown in FIG. 10 or the heat may be provided by an electrical power supply 45 generally provided, e.g. in an aircraft as shown in FIG. 11. During the melting cycle, the melted water flows down into the container 13 through a valve 15A that may be selectively switched to fill the melted water into a collection tank 13A. However, normally the water will be collected in the container 13 for several repeated cycles, whereby contaminations are collected in the container 13. Repeated cycles have a diminishing cleaning efficiency due to the concentration increase of the solution being treated and collected in the container 13. Cleaned water is taken either from the container 13 or from the tank 13A as described below.

Figure 6:
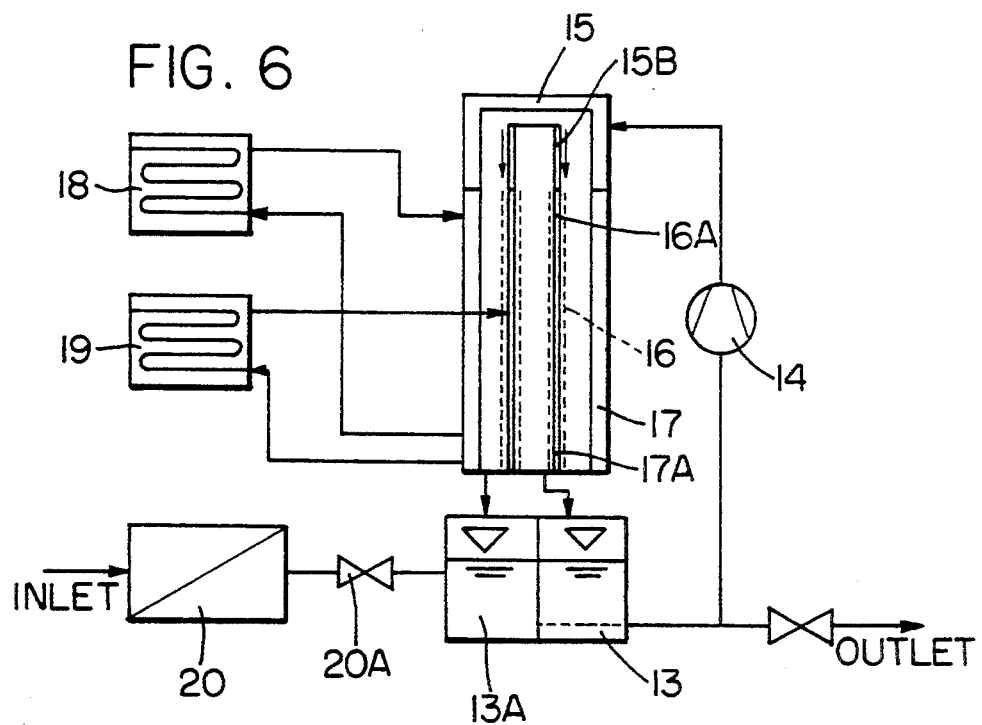
FIG. 6 is a view similar to that of FIG. 5, but showing a freeze concentration device with two chambers for using the crystallization heat generated in one chamber for the melting in the other chamber and vice versa.

FIG. 6 illustrates an embodiment similar to that of FIG. 5, however, the double-walled tank 15 has been equipped with a further tank 15B forming a second chamber also vertically arranged inside the tank 15. Two crystal layers 16 and 16A are now formed. Both walls 17 and 17A are hollow and connected to the heat exchangers 18, 19 through respective valves not shown for simplicity's sake. Two collecting containers 13 and 13A or a single collecting container may be used. The valve combinations and any pumps are not shown in FIG. 6.

In the embodiment of FIG. 6 it is possible to utilize the crystallization heat generated along the wall surface of one chamber for the melting of the crystal layer on the surface of the other chamber and vice versa. However, it may also be desirable to use the heat from the exchanger 19 as described in addition to the utilization of the crystallization heat for the melting.

As mentioned above, one or two collecting containers 13, 13A may be used. If only one container is used, the portion of the waste water in which the concentration of contaminants has been increased, is removed from the container and the container is cleaned so that it does not contain any contaminants when the melting cycle begins. Where two containers are used, the arrangement of respective valves will permit the recycling into one container and the collection in the other container.

It has been found that purification degrees of up to 95% with regard to solid particles can be achieved with the trickle film reactor of FIGS. 5 and 6. With regard to components in solution the cleaning efficiency is in excess of 91%. The same cleaning efficiency in excess of 91% is achieved for chemical oxygen requirement CSB, for the total organic carbon content TOC, and for the ammonium nitrogen content.

Figure 7:
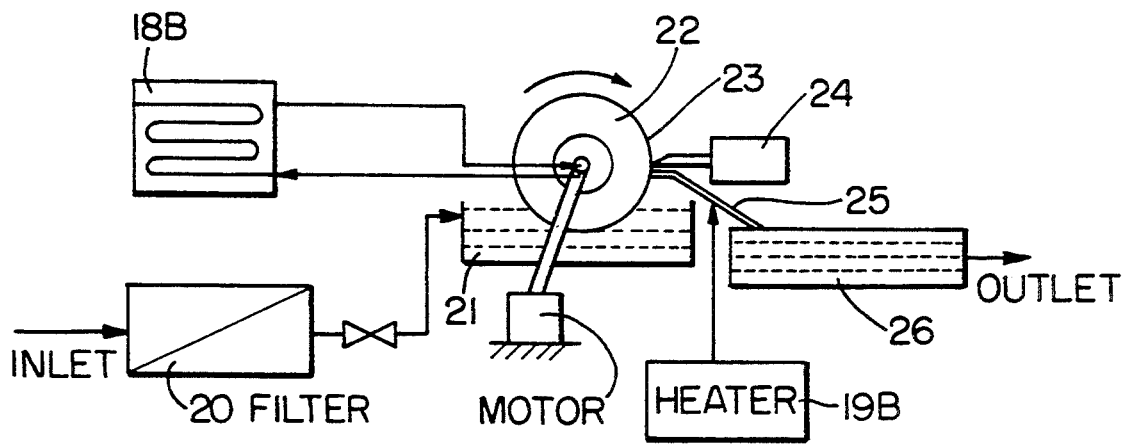
FIG. 7 is a side view of an embodiment with a freeze roller dipping into a waste water container forming a freeze concentration stage.

FIG. 7 illustrates still another embodiment of a freeze concentration stage using a freezing roller 22 driven, for example, clockwise by a motor and gear. The roller 22 is so positioned that it dips into the waste water containing tank 21 which receives its input from the filter 20 as described. The roller 22 is cooled by a refrigeration unit 18B of the type described above. As the roller 22 rotates, an ice layer 23 is formed which is shaved off or scraped off by a scraper device 24. The shaved off ice falls onto a heated chute 25 that guides the melting water into a collecting tank 26 for the fresh water. A heater 19B heats the chute 25 sufficiently to melt the ice. FIG. 10 shows such a heater 19B.

The embodiment of FIG. 8 comprises a freeze concentration stage in the form of a crystal suspension reactor 27 which as such is known. A pump 34 feeds water to be cleaned from a supply container into the bottom of the reactor 27. A refrigeration unit 18 is connected to a central cooling pipe 30 and to an outside surface of the reactor 27. A motor 31 drives a propeller 31A which maintains circulation within the reactor to agitate the crystal suspension 32. A separation column 33 discharges ice crystals into a tank 29. A further pump 34A feeds an ice mixture and after separation ice crystals into a container 35 which is heated by a heat exchange unit 19 to provide clean water at the outlet of the container 35.

FIG. 9 illustrates a heat exchanger 36 cooperating with an outer wall 37 of an air- or spacecraft. Heat exchange coils 36A are so arranged between the outer wall 37 and an inner wall 38 of the craft body that a heat exchange takes place with the cooled temperatures prevailing outside the craft at high altitudes. Heated up coolant passes through a pipe 39 into the heat exchange coils 36A and the cooled coolant is returned through a pipe 40. The device shown in FIG. 9 can be used for the refrigeration unit 18, 18A. However, the invention is not limited to such heat exchangers.

FIG. 10 illustrates a heat exchanger 41 that takes advantage of the hot gases of an engine exhaust. Valves in a duct 42 provide a supply of tapped-off hot exhaust gas into the heat exchanger 41 and the gas that has given off heat is discharged at 43 to the environment. A heating circuit 44 passes through the heat exchanger 41 and can be used for the heating units 19, 19B.

FIG. 11 uses an electrical generator 45 connected through an electrical conductor 46 to the heat exchanger 19 for providing the heat in a heating circuit 44 for the melting of the ice as described above.

With regard to the embodiment of FIG. 7, it should be mentioned that the roller freezer permits a continuous operation because freezing of ice crystals on the surface of the roller 22 and thawing of scraped off crystals on the chute 25 can take place simultaneously. Similarly, a continuous operation is possible with the system of FIG. 8. The embodiment of FIG. 8 has the advantage that the suspension provides large crystal surfaces so that the crystal growth rate can be kept small, whereby high degrees of purification are achieved because contaminations cannot function as crystal seeds. As mentioned, such a crystal suspension reactor 27 can work on a continuous basis, because the thawing takes place in the separate container 35 while the crystallization takes place inside the reactor 27.

TABLE 1

(Relating to FIG. 1)

| Parameter | Waste Water (untreated) | Mechanical Filter (filtered) | Freeze Conc. 1 | Freeze Conc. 2 | Micro/ Ultra Filtra. | REV. OSM.1 R01 | REV. OSM.2 R02 | ACTIVE CHAR-COAL | UV DISIN-FECTION |
|---|---|---|---|---|---|---|---|---|---|
| TOC [mg/l] (total organic carbon content) | 3500 | 3500 | 385 | 4 | 3 | 1 | — | 0 | 0 |
| CSB [mg/l] (chem.oxygen requirement) | 10000 | 10000 | 1200 | 48 | 46 | 10 | — | 2 | 2 |
| $NH_4$—N [mg/l] (ammonium nitrogen content) | 3000 | 3000 | 570 | 80 | 80 | 3 | — | 2 | 2 |
| Conductivity [$\mu$S/cm] | 15000 | 15000 | 1800 | 36 | 36 | 6 | — | 6 | 6 |
| Volume [m$^3$] | — | 0.002 | 0.08 | 0.08 | 0.004 | 0.004 | — | $1 \cdot 10^{-3}$ | $1 \cdot 10^{-4}$ |
| Weight [kg] | — | 6 | 25 | 25 | 3 | 3 | — | 2 | 3 |
| Reference Nos. FIG. 1 | 1 | 2 + 3 | 4 | 4' | 6 | 7 | NONE | 8 | 9 |

TABLE 2

(Relating to FIG. 2)

| Parameter | Waste Water (untreated) | Mechanical Filter (filtered) | Freeze Conc. 1 | Freeze Conc. 2 | Micro/ Ultra Filtra. | REV. OSM.1 R01 | REV. OSM.2 R02 | ACTIVE CHAR-COAL | UV DISIN-FECTION |
|---|---|---|---|---|---|---|---|---|---|
| TOC [mg/l] (total organic carbon content) | 3500 | 3500 | 385 | 4 | 3 | — | — | 0 | 0 |
| CSB [mg/l] (chem.oxygen requirement) | 10000 | 10000 | 1200 | 48 | 46 | — | — | 30 | 30 |
| $NH_4$—N [mg/l] (ammonium nitrogen content) | 3000 | 3000 | 570 | 80 | 80 | — | — | 60 | 60 |
| Conductivity [$\mu$S/cm] | 15000 | 15000 | 1800 | 36 | 36 | — | — | 36 | 36 |
| Volume [m$^3$] | — | 0.002 | 0.08 | 0.08 | 0.004 | — | — | $1 \cdot 10^{-3}$ | $1 \cdot 10^{-4}$ |
| Weight [kg] | — | 6 | 25 | 25 | 3 | — | — | 2 | 3 |
| Reference Nos. FIG. 2 | 1 | 2 + 3 | 4 | 4' | 6 | NONE | NONE | 8 | 9 |

TABLE 3

(Relating to FIG. 3)

| Parameter | Waste Water (untreated) | Mechanical Filter (Filtered) | Freeze Conc. 1 | Freeze Conc. 2 | Micro/ Ultra Filtra. | REV. OSM.1 R01 | REV. OSM.2 R02 | ACTIVE CHAR-COAL | UV DISIN-FECTION |
|---|---|---|---|---|---|---|---|---|---|
| TOC [mg/l] (total organic carbon content) | 3500 | 3500 | 385 | — | 260 | 150 | 45 | 15 | 15 |
| CSB [mg/l] (chem.oxygen requirement) | 10000 | 10000 | 1200 | — | 1000 | 220 | 22 | 12 | 12 |
| $NH_4$—N [mg/l] (ammonium nitrogen content) | 3000 | 3000 | 570 | — | 570 | 23 | 1 | 1 | 1 |
| Conductivity [$\mu$S/cm] | 15000 | 15000 | 1800 | — | 1800 | 360 | 36 | 36 | 36 |
| Volume [m$^3$] | — | 0.002 | 0.08 | — | 0.004 | 0.004 | 0.004 | $1 \cdot 10^{-3}$ | $1 \cdot 10^{-4}$ |
| Weight [kg] | — | 6 | 25 | — | 3 | 3 | 3 | 2 | 3 |
| Reference Nos. FIG. 3 | 1 | 2 | 3 | NONE | 6 | 7 | 7' | 8 | 9 |

TABLE 4

(Relating to FIG. 4)

| Parameter | Waste Water (untreated) | Mechanical Filter (Filtered) | Freeze Conc. 1 | Freeze Conc. 2 | Micro/ Ultra Filtra. | REV. OSM.1 R01 | REV. OSM.2 R02 | ACTIVE CHARCOAL | UV DISINFECTION |
|---|---|---|---|---|---|---|---|---|---|
| TOC [mg/l] (total organic carbon content) | 3500 | 3500 | 385 | — | 260 | 150 | — | 100 | 100 |
| CSB [mg/l] (chem.oxygen requirement) | 10000 | 10000 | 1200 | — | 1000 | 220 | — | 150 | 150 |
| $NH_4$—N [mg/l] (ammonium nitrogen content) | 3000 | 3000 | 570 | — | 570 | 23 | — | 16 | 16 |
| Conductivity [$\mu$S/cm] | 15000 | 15000 | 1800 | — | 1800 | 360 | — | 360 | 360 |
| Volume [$m^3$] | — | 0.002 | 0.08 | — | 0.004 | 0.004 | — | $1 \cdot 10^{-3}$ | $1 \cdot 10^{-4}$ |
| Weight [kg] | — | 6 | 25 | — | 3 | 3 | — | 2 | 3 |
| Reference Nos. FIG. 4 | 1 | 2 | 3 | NONE | 6 | 7 | NONE | 8 | 9 |

Although the invention has been described with reference to specific example embodiments it will be appreciated that it intended to cover all modifications and equivalents within the scope of the appended claims.

What we claim is:

1. A method for treating and recovering waste water in an aircraft or a spacecraft comprising the following sequence of steps: first mechanical filtering, second at least one freeze concentration as a main cleaning operation immediately downstream of said mechanical filtering, third at least one membrane separating directly downstream of said freeze-concentration, fourth charcoal filtering, and fifth disinfection, whereby said main cleaning operation by freeze concentration is performed between said mechanical filtering and said membrane separating for protecting a membrane in said membrane separating, and wherein heat is removed from said heat concentration by using cold temperatures prevailing outside said aircraft or spacecraft.

2. An apparatus for treating and recovering waste water, comprising the following sequence of series connected components: a waste water supply, at least one pump for conveying water through the apparatus, at least one mechanical filter, at least one freeze concentration stage directly downstream of said mechanical filter, at least one membrane filter stage comprising at least one membrane directly downstream of said freeze concentration stage, at least one charcoal filter, a disinfecting stage, at least one fresh water collector, and means for operatively interconnecting said components in said series, wherein said freeze concentration stage is arranged directly upstream of said membrane filter stage as viewed in a flow direction from said waste water supply to said fresh water collector for protecting said membrane in said membrane filter stage, said apparatus further comprising refrigeration device including an outer skin heat exchanger for discharging heat to the environment of an air- or spacecraft in flight and taking up cooling from said environment.

3. The apparatus of claim 2, wherein said mechanical filter comprises at least one filter selected from the group consisting of screen filters and gap filters.

4. The apparatus of claim 2, wherein said membrane filter stage comprises at least one filter selected from the group consisting of ultrafilters, micro-filters, and osmosis filters comprising said at least one membrane.

5. The apparatus of claim 2, wherein said at least one freeze concentration stage comprises a crystal layer reactor including an inlet tank for waste water, a crystallizing tank, a pump for feeding waste water into said crystallizing tank, a refrigeration unit connected to said crystallizing tank for refrigerating said crystallizing tank, an ice melter connected to said crystallizing tank for melting a crystallized ice layer in said tank, and an ice water collector for collecting melted ice water.

6. The apparatus of claim 5, wherein said crystal layer reactor is a trickle film reactor.

7. The apparatus of claim 6, wherein said trickle film reactor comprises a housing with double walls forming a cylindrical ring space selectively connectable to said refrigeration unit and to said ice melter.

8. The apparatus of claim 5, wherein said trickle film reactor comprises a housing with double walls forming a multichamber container, and means for using crystallization heat generated by the formation of a crystallized ice layer on a surface of one chamber for melting an already formed crystallized ice layer on a wall of another chamber in said housing.

9. The apparatus of claim 2, wherein said at least one freeze concentration stage comprises a first water container for water to be frozen, a freeze roller rotatably mounted in said container, a drive for rotating said freeze roller, refrigeration unit for cooling said freeze roller to form a layer of crystallized ice on a surface of said freeze roller, a scraper for shaving off ice from said freeze roller, an ice collector for collecting shaved off ice, an ice melter for melting shaved off ice, and a second tank :for collecting water from said ice collector.

10. The apparatus of claim 2, wherein said at least one freeze concentration stage comprises a crystal suspension reactor, a water feeding device for feeding water to be frozen into said crystal suspension reactor, a refrigeration device connected to said crystal suspension reactor for cooling said crystal suspension reactor, at least one separation column for separating ice crystals, a heater for thawing separated ice crystals, and an ice water collector for collecting melted ice water.

11. The apparatus of claim 2, wherein said at least one freeze concentration stage comprises an ice melter for melting an ice layer formed in said freeze concentration stage, and means for conveying heat from an aircraft or spacecraft engine to said melting means.

12. The apparatus of claim 11, wherein said heat conveying means convey hot air tapped-off said engine, to said melting means.

13. The apparatus of claim 2, wherein said at least one freeze concentration stage comprises an electrical heater for melting ice formed in said freeze concentration stage.

* * * * *